United States Patent

Feldman et al.

[11] Patent Number: 5,938,308
[45] Date of Patent: *Aug. 17, 1999

[54] PROJECTION POINTER

[75] Inventors: Michael R. Feldman; Alan D. Kathman, both of Charlotte, N.C.

[73] Assignee: Digital Opitcs Corporation, Charlotte, N.C.

[ * ] Notice: This patent is subject to a terminal disclaimer.

[21] Appl. No.: 08/904,556

[22] Filed: Aug. 4, 1997

Related U.S. Application Data

[62] Division of application No. 08/668,976, Jun. 25, 1996, Pat. No. 5,718,496.

[51] Int. Cl.$^6$ .................................................. G03B 21/00
[52] U.S. Cl. ............................................................... 353/42
[58] Field of Search ....................... 353/42, 43; 345/180, 345/182, 183

[56] References Cited

U.S. PATENT DOCUMENTS

| | | | |
|---|---|---|---|
| 3,656,845 | 4/1972 | Koch-Boss | 353/42 |
| 5,024,494 | 6/1991 | Williams et al. | 350/3.6 |
| 5,161,059 | 11/1992 | Swanson et al. | |
| 5,202,775 | 4/1993 | Feldman et al. | 359/11 |
| 5,450,148 | 9/1995 | Shu et al. | 353/42 |
| 5,477,283 | 12/1995 | Casey | 353/42 |
| 5,694,230 | 12/1997 | Welch | 359/13 |
| 5,718,496 | 2/1998 | Feldman et al. | 353/42 |

FOREIGN PATENT DOCUMENTS

| | | |
|---|---|---|
| 0348863 | 1/1990 | European Pat. Off. . |
| 0429243 | 5/1991 | European Pat. Off. . |
| 0615142 | 9/1994 | European Pat. Off. . |
| 0704721 | 4/1996 | European Pat. Off. . |

OTHER PUBLICATIONS

Diffractive Optics Gives Laser Pointers a New Twist by Diane H. Hochmuth and Patrick J. Readron in Photonics Spectra, Aug. 1995, p. 95.

Iterative Encoding of High–efficiency Holograms for Generation of Spot Arrays by Feldman and Guest, in Optics Letters, vol. 14, No. 10, pp. 479–481, May 15, 1989.

*Primary Examiner*—William Dowling
*Attorney, Agent, or Firm*—Jones & Volentine, L.L.P.

[57] ABSTRACT

An improved optical system is disclosed for projecting light in the form of an image to a remote target. The laser light source and a holographic optical element are mounted together in optical alignment. The optical element is created using iterative discrete computer encoding for optimum efficiency. In alternate embodiments, the diffractive optical element has a collimating lens encoded into the grating levels and it also performs soft aperture circularizing using either amplitude or phase control over the coherent light. An embossed diffractive optical element laminated to an injection-molded refractive element is also disclosed.

13 Claims, 9 Drawing Sheets

PROJECTION POINTER

This application is a divisional application Ser. No. 08/668,976, filed on Jun. 25, 1996, now U.S. Pat. No. 5,718,496, the entire contents of which are hereby incorporated by reference.

BACKGROUND Of THE INVENTION

1. Field of the Invention

This invention relates to the projection of an image from a hand held pointer onto another image in order assist a person in the description of the second image. More particularly, the present invention relates to a writing pen like laser pointer for projecting one or more images.

2. Description of the Prior Art

At present, the commercially available laser pointers that have the capability of projecting other than the most simple geometric pattern images are inefficient in that the introduction of the slides or masks to create the more complex images block a substantial portion of the light that is emitted from the light source.

An example of such a prior art system is disclosed in U.S. Pat. 5,450,148 in the form of a laser pointer having a shell body 20 and mark patterns 421 which are masks as shown in FIG. 8 of this patent. A more efficient but limited straight line pattern can be provided by cylindrical lenses 423.

In another reference, U.S. Pat. No. 5,024,494, a laser light beam in the shape of an arrow has been generated by a laser pointer 12 such as the pointer described above in U.S. Pat. No. 5,450,148 and the arrow is projected onto a rotating screen which displays a three dimensional image. This second reference then modulates the pointing laser beam in synchronism with a rotating screen so as to be reflected from the screen to a viewer only when the screen is in a predetermined position. In an alternate embodiment shown in FIG. 2 of this U.S. Pat. No. 5,024,494, the rotating screen is translucent and has fiber optics or a hologram to direct the light in a direction parallel to the axis of rotation toward a stationary sensor 15 in order to locate the three dimensional position of the point in space. No improvement in the efficiency of generating a projection image is taught or suggested by this patent.

SUMMARY OF THE INVENTION

The instant invention provides a much more efficient complex image pointer by redirecting substantially all of the light generated by the light source in order to create the desired image and by not blocking portions of the light in the image creation process.

It is an advantage of the invention that a brighter and more easily seen complex image is provided at the image plane.

It is a further advantage of the invention that the brighter and more easily seen image is obtained without the need for increasing light power and accompanying loss of battery charge.

It is a still further advantage of the invention that substantially no heat losses are created in the generation of a complex image such as a company logo or other novel image desired by the presenter.

These and other advantages are obtained by generating a complex pointer image through the use of a diffractive optical element in place of the refractive elements and masks or slides of the prior art. In an alternate embodiment, of the invention, a diffractive optical element is used to create a soft aperture for a simpler beam of coherent light, avoiding the interference, spurious divergence and resultant dark areas associated with hard apertures.

DETAILED DESCRIPTION OF A PREFERRED EMBODIMENT

Figure 1:
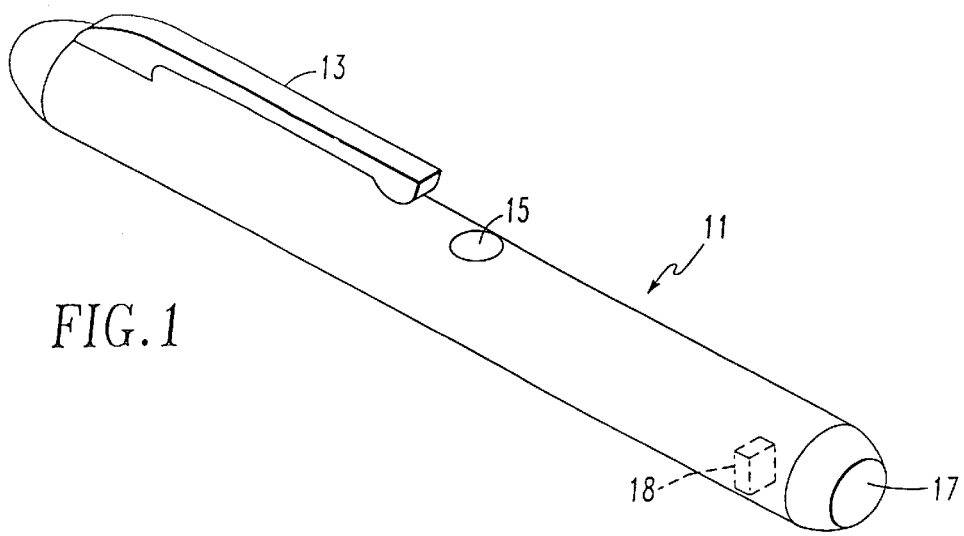
FIG. 1 shows a perspective view of a hand held pointer in which the instant invention finds utility.

Referring now to FIG. 1, a detailed description of the invention will be set forth. A case 11 is provided in a shape convenient to the hand of a person pointing with the beam of light provided through the optics of the invention. Example shapes include those similar to a writing pen, which allow the instrument to be carried in a pocket, briefcase or purse. A clip 13 may, be mounted at one end to hold the instrument in a pocket. An electrical switch 15 is provided to actuate a laser light source which provides the coherent light needed by the diffractive optics of the invention in order to control the light wavefront in such a manner as to create a desired complex pointing image. The switch 15 may be similar to a flash light switch or it may be fabricated as a part of the clip 13. The beam of light containing the pointing image emanates from one end of the instrument, preferably through a transparent material 17 which can be easily kept free of dust and dirt that would otherwise occlude the pointing image. The content of the pointing image may by exchanged for another image by moving slide 41. Slide 41 is similar to the alternate embodiment shown in FIG. 6 of U.S. Pat. No. 5,450,148 mentioned above, but of course the element being slid is much different as will be further explained.

Figure 2:
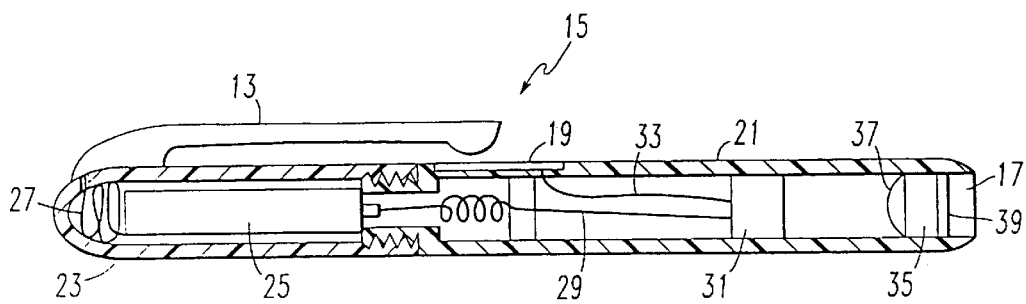
FIG. 2 is a sectional view of the placement of the diffractive opitical element in relation to the laser light source and other parts.

FIG. 2 is a section view of the instrument of FIG. 1 showing the relationship of the optics, laser, battery and switch. Case 11 is made up of two parts, a barrel 21 and a battery compartment 23 which may be joined by threaded portions in much the same manner as a writing instrument. A battery 25 is placed in the case 11 so as to be conveniently connected to the switch and laser and also in a position to provide comfortable weight balance in the instrument to facilitate handling by the user. The battery 25 is electrically connected to one pole of the switch 15, either by a wire or by a land pattern on a circuit board or by both forms of conductor. In FIG. 2, the battery 25 is connected by a coiled spring wire 27 to clip 13 which acts as one sole of is switch 15. Likewise the battery 25 is electrically connected to the laser 31 by another coiled wire spring 29 or by a land pattern on a circuit board. Another pole 19 of switch 15 is electrically connected to the laser 31 by a wire 33 or by a land pattern on the circuit board. Actuation of the switch 15 thereby provides electrical current through the laser light source, causing it to emit coherent light waves through optical elements on a transparent substrate 35. A diffractive optical element 39 collimates and distributes the light into a plurality of picture element beams, each beam defining a picture element of the complex projection image. Element 39 is described below in more detail with respect to FIG. 3.

When it is desired to separate collimation from image generation, a separate refractive collimating lens is provided at surface 37 of substrate 35 and a computer generated diffractive optical element 39 in the opposite surface. Diffractive optical element 39 is preferably in the form of a multilevel stepwise approximation to a continuous surface relief phase grating. The multilevel surface relief pattern is determined by computing an optimum approximation to a continuous phase grating in a reasonable number of discrete levels. An eight level approximation can be fabricated in three etching process iterations and therefore it has been used to illustrate the invention. For many images and substrate materials, an eight level diffractive optical element is a preferred embodiment of the invention. In other cases, more levels are needed to reduce spurious artifacts in the image, and in still other cases only a two level or binary diffractive optical element gives adequate image definition. The phase level coding of the diffractive optical element 39 for generating the image is preferably created by computer calculations using the methods disclosed in the article by Feldman and Guest, "Iterative encoding of high-efficiency holograms for generating spot arrays" OPTICAL LETTERS, 14, 479–481 (1989).

The phase grating level for each grating area of constant phase of the image generating diffractive optical element can be expressed by:

$$\phi(x,y)$$

In an alternate embodiment, the collimating lens 37 is integrated into the image generating diffractive optical element 39 by combining the phase levels for the two different functions into one diffractive optical element using the computer which is calculating the levels.

The phase grating levels for the lens portion of the combination are calculated in accord with the methods disclosed in U.S. Pat. No. 5,161,059 to Swanson et al. and U.S. Pat. No. 5,202,775 to Feldman et al. The teachings of U.S. Pat. Nos. 5,161,059 and 5,202,775 are hereby incorporated herein by reference.

The continuous phase expression for such a lens is (in the paraxial approximation) given by:

$$\frac{-\pi}{\lambda f}(x^2 + y^2)$$

where f is the focal length of the lens and where lambda is the wave length of the light source.

The expression of the phase of a diffraction element that combines the collimating lens function and the image generating function is given by:

$$\text{phase} = \phi(x, y) - \frac{\pi}{\lambda f}(x^2 + y^2).$$

The methods disclosed in U.S. Pat. Nos. 5,161,059 and 5,202,775 are used to convert this phase function into discrete phase levels.

Figure 3:
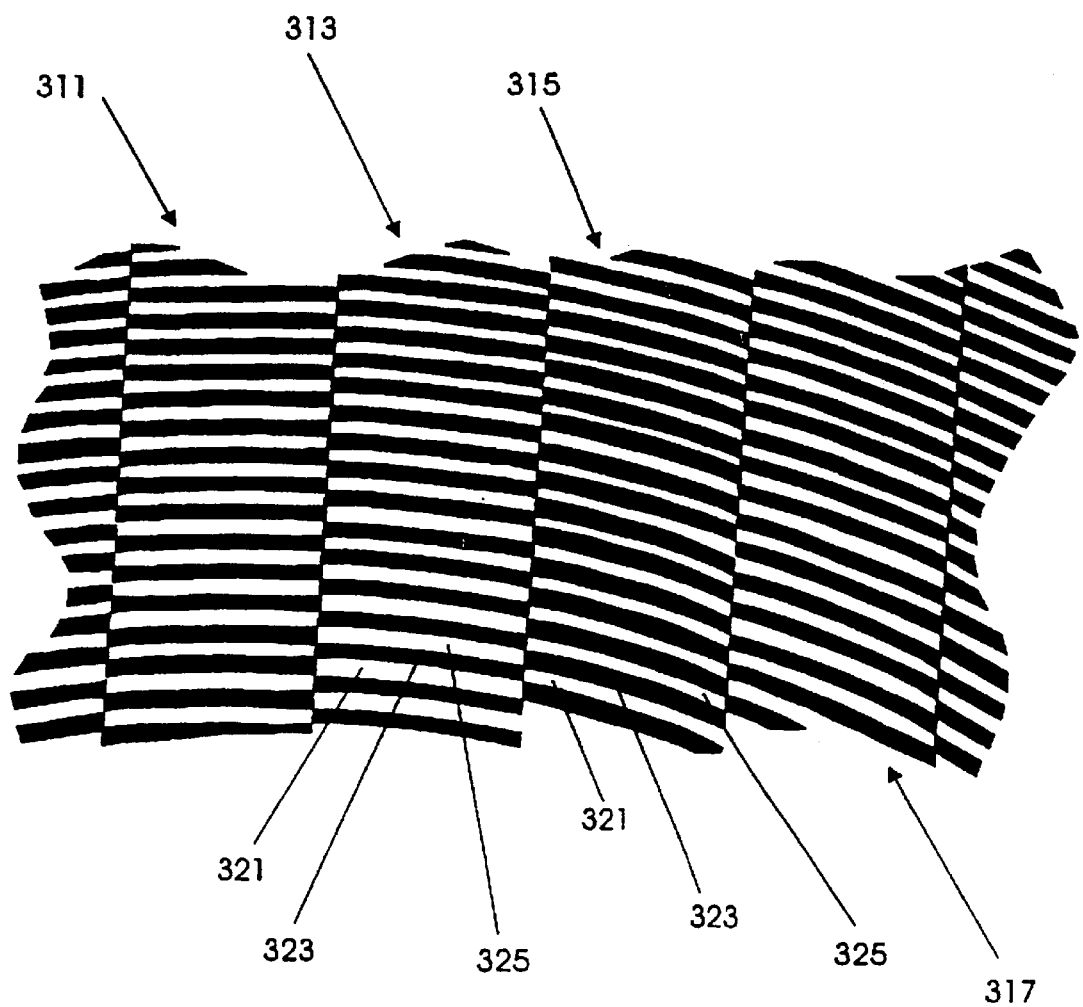
FIG. 3 is an etch mask for combining the phase levels for two different functions into one diffractive optical element.

FIG. 3 is a representation of the areas of constant phase in a portion of an etch mask for use during one etching iteration in the manufacture of a diffractive optical element calculated to contain both lens and image generating functions. The image generating portions of the combined diffractive optical element are labeled 311, 313, 315 and 317 and they appear as vertical bars of gratings. Each vertical bar grating has within it, a portion of a number of concentric ring gratings that embody the lens portion of the diffractive optical element. For example image grating 315 has within it, a portion of each of lens gratings 321, 323 and 325. Note that other portions of lens grating 321, 323 and 325 appear on image grating 313 but they are shifted from their respective positions in grating 315 due to the addition of the level from the image component.

Figure 4:
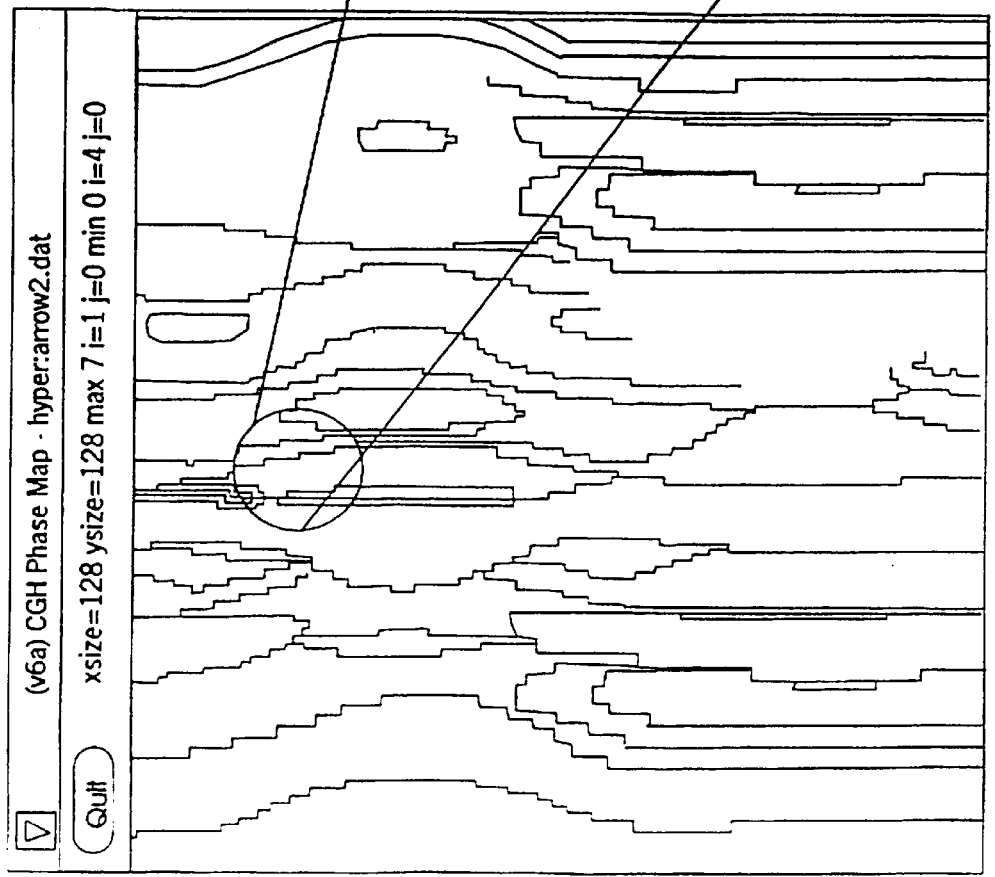
FIG. 4 is a representation of the phase levels in the diffractive optical element for a complex pointer image in the form of an arrow.
Figure 4:
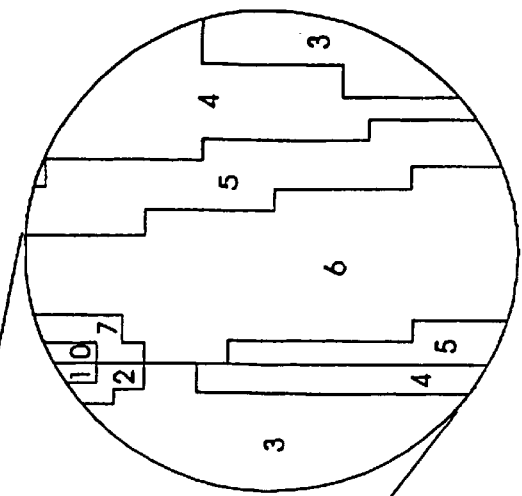

FIG. 4 shows a topographical contour map of the phase levels used to provide an arrow pointing image, with a separate refractive collimating lens 37. The image generated by FIG. 4 appears in FIG. 5. FIG. 4 is a representation of an eight-level diffractive optical element. Because of the complexity of the levels of the diffractive optical element represented in FIG. 4, a small part of the contour map is expanded to show more detail. The eight levels shown in the expanded area are labeled 0 through 7 to differentiate them from each other. The lowest or deepest etched level is labeled 7. Intermediate depth levels 6 through 1 have increasing thickness of material under them and the un-etched areas 0 have the thickest optical material. The diffractive optical element of FIG. 4 need only be approximately one millimeter square and therefore the barrel 21 of FIG. 2 can easily contain more than one image generating optical element. It will be appreciated that any of a number of element substitution techniques including those disclosed in U.S. Pat. No. 5,450,148, hereby incorporated by reference, may be used to allow the pointer to alternately project different images.

Figure 5:
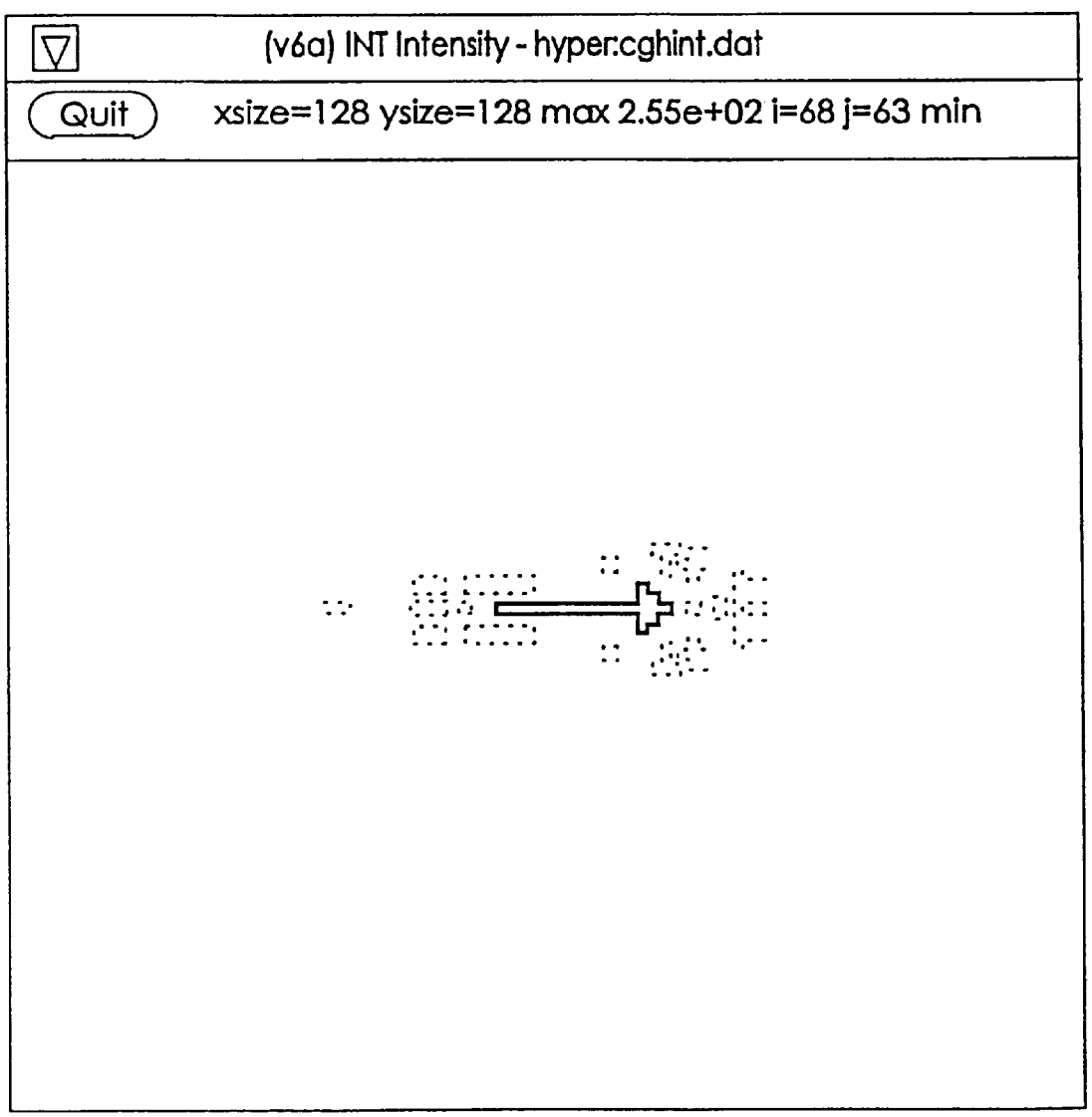
FIG. 5 is an example image in the form of an arrow.

The arrow shown in FIG. 5 is created by a plurality of picture elements or spots of light, each spot being generated by substantially all portions of the diffractive optics of FIG. 4 as is well known to be one of the advantages of holographic elements, whether they are continuous or discrete computer-generated optical elements. Being generated by an array of picture elements, the image is not confined to combinations of straight line segments but may be any image including, for example, a company logo. It will be noted that some unwanted spots of light fall near to the arrow. These artifacts can be reduced in number and in intensity by increasing the number of levels in the diffractive optical element.

Figure 6:
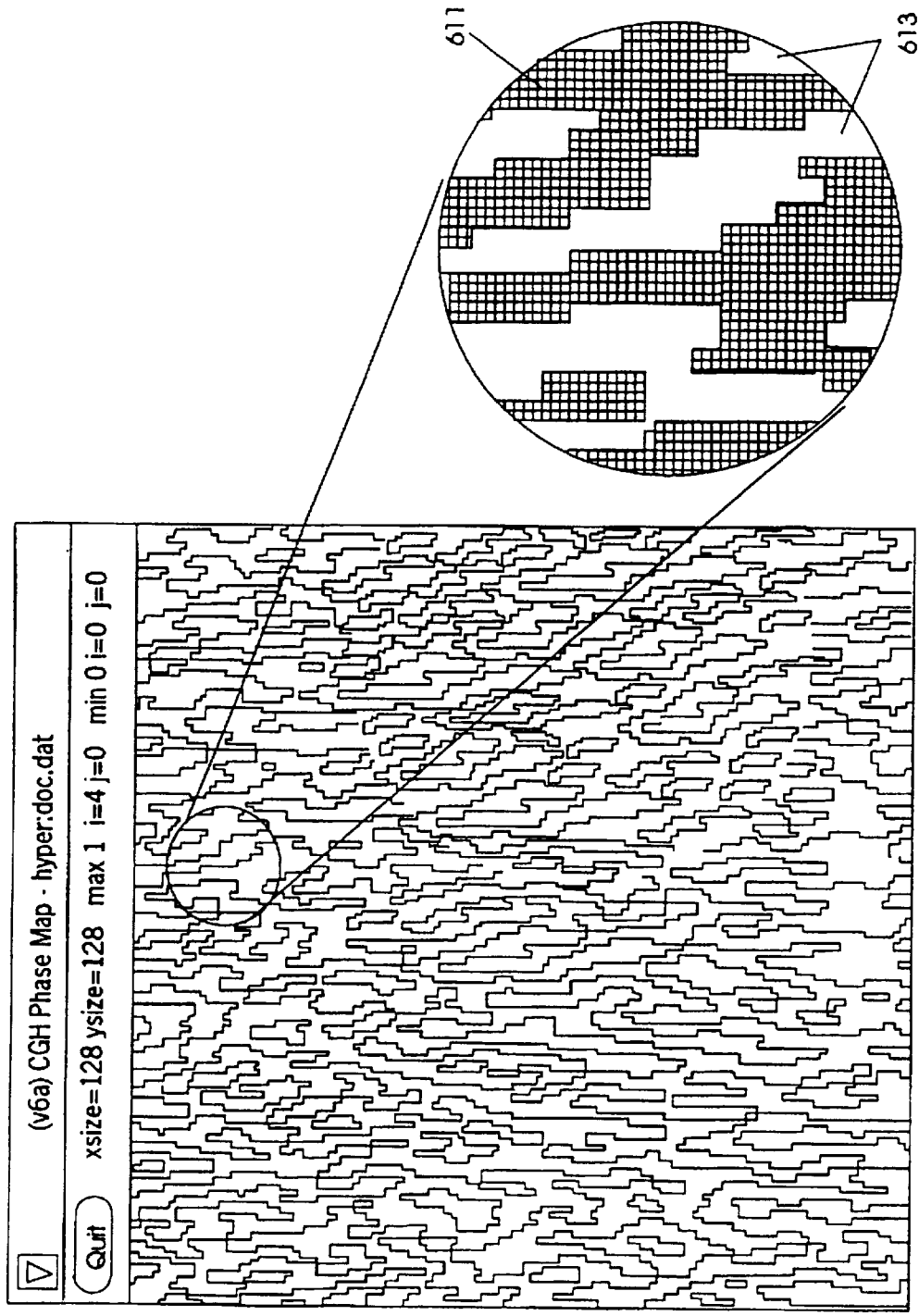
FIG. 6 is a representation of the phase levels in a binary diffractive optical element for an example image in the form of a company logo and its reverse.
Figure 7:
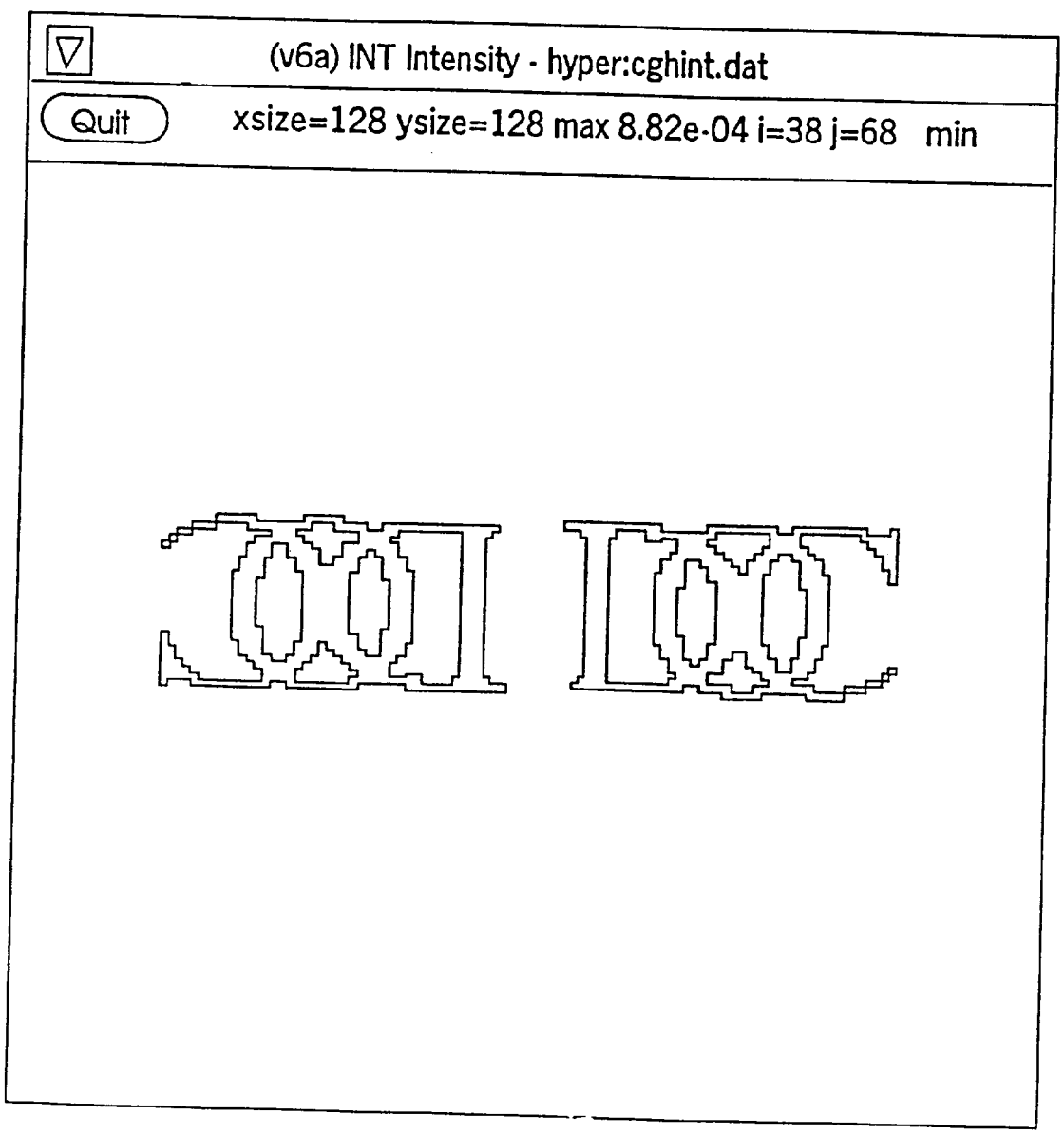
FIG. 7 is the example image formed by the diffraction optics of FIG. 5.

FIG. 7 is a company logo and its reverse image. FIG. 7 includes a reverse image because it was generated by a two-level or binary diffractive optical element which is represented in FIG. 6. Again, to show more detail, a small area of the binary diffractive optical element is expanded and the levels are labeled 611 and 613. A two-level optical element directs light in two directions, contributing to picture elements in an image and picture elements in a reverse image at the same time.

Figure 8:
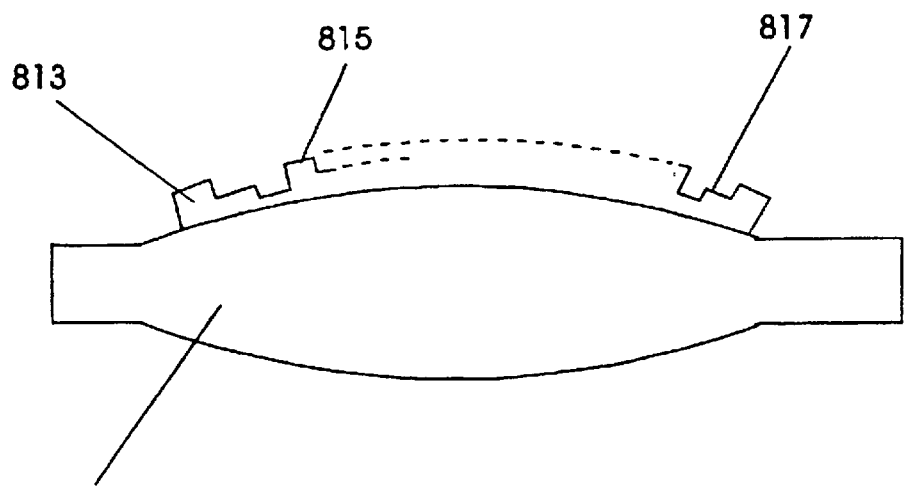
FIG. 8 is an embossed diffractive optical element assembly.

FIG. 8 is a cross section of a reduced cost embodiment for the transparent substrate 35 shown in FIG. 2. A collimating plastic injection-molded lens 811 acts as the refracting lens surface 37 and the substrate 35. An embossed plastic replica 813 is embossed from a computer-generated diffractive master phase grating and is laminated onto a surface of lens 811 using an adhesive such as a transparent UV cured epoxy or other substantially equivalent adhesive. The image generating phase grating levels are embossed into element 813 before assembly because it can then be done on a mass production basis. Since the alignment of collimation and image generating elements are not as critical as for example circularizing optics, a convenient assembly jig and adhesive assembly process is a preferred method of assembly. When adequate machining processes are developed to produce a cost-effective injection mold, the image generating phase gratings may be molded directly into the refractive plastic lens 811.

Figure 9:
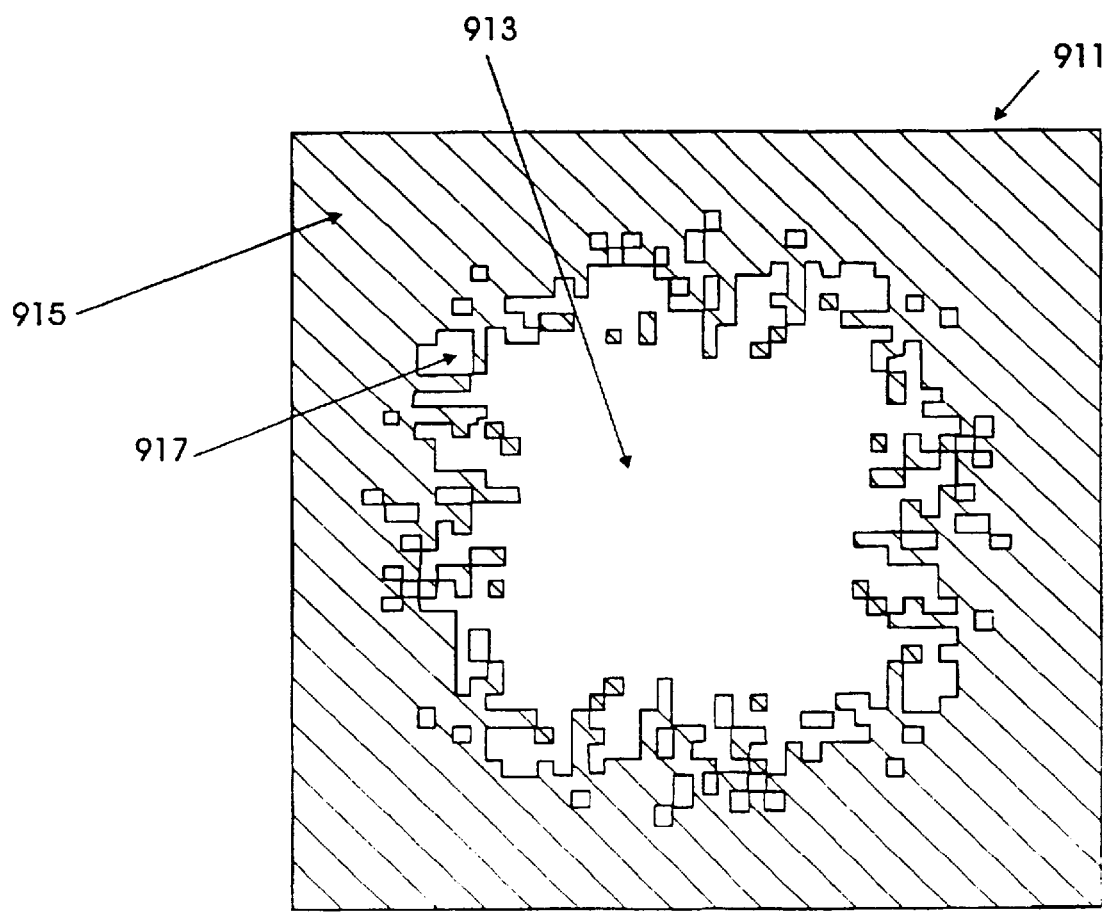
FIG. 9 is a circularizing soft aperture diffractive optical element.

Referring now to FIG. 9, a preferred embodiment of an apodized aperture or a soft aperture element is shown in the form of a diffractive phase grating. Many laser light sources provide light in a non-circular, ellipse-like shape. It is actually preferred that the shape of the beam be circularized using optical shaping lenses, either refractive or diffractive because optical shaping utilizes more of the available light by redirecting it into the shape of a circular beam. For a low cost product, such optical shaping is costly because it is usually required that doublets or pairs of lenses be employed to redirect the light from the wider portion of the elliptical shape without also distorting the light from the narrower portion. Whenever doublets or pairs of optical elements are used to compensate for distortion, costly optical alignment becomes critical. The use of an aperture is currently a practical alternative that is made even more attractive by shaping the edges so as to provide a soft aperture in order to minimize spurious divergence and dark areas due to diffraction at a hard aperture edge.

The transparent component 911 in FIG. 9 is a diffractive optical element which is mounted into the barrel 21 of the improved pointer. The shading lines represent light deflecting phase gratings that occlude by scattering the light from the wide portions of the laser output beam. The transparent component 911 has an aperture area in its central region 913 which is grating free. It also has an occlusion area in its outer region 915 where substantially all of the light is scattered. Between these two regions 913 and 915 is a transition region 917 where light is only partially occluded. The transition region has areas with scatter phase grating and areas without grating arranged in a random or pseudo random fashion so as to provide a soft aperture. The soft aperture reduces the formation of fringes or dark areas in the beam of light passing through the aperture.

An alternative to the above described phase grating is an amplitude modulator where the shaded area will all be opaque. The opacue areas are created using photolithographic methods by depositing a material such as chrome or other substantially equivalent material and using a mask to etch the material into a substantially similar pattern to that shown in FIG. 9 but without the gratings. The irregular pattern of light transmission near the edge of the aperture effectively softens the edge of the aperture and adds light into the dark areas that would otherwise be formed by diffraction at the edge.

Figure 10:
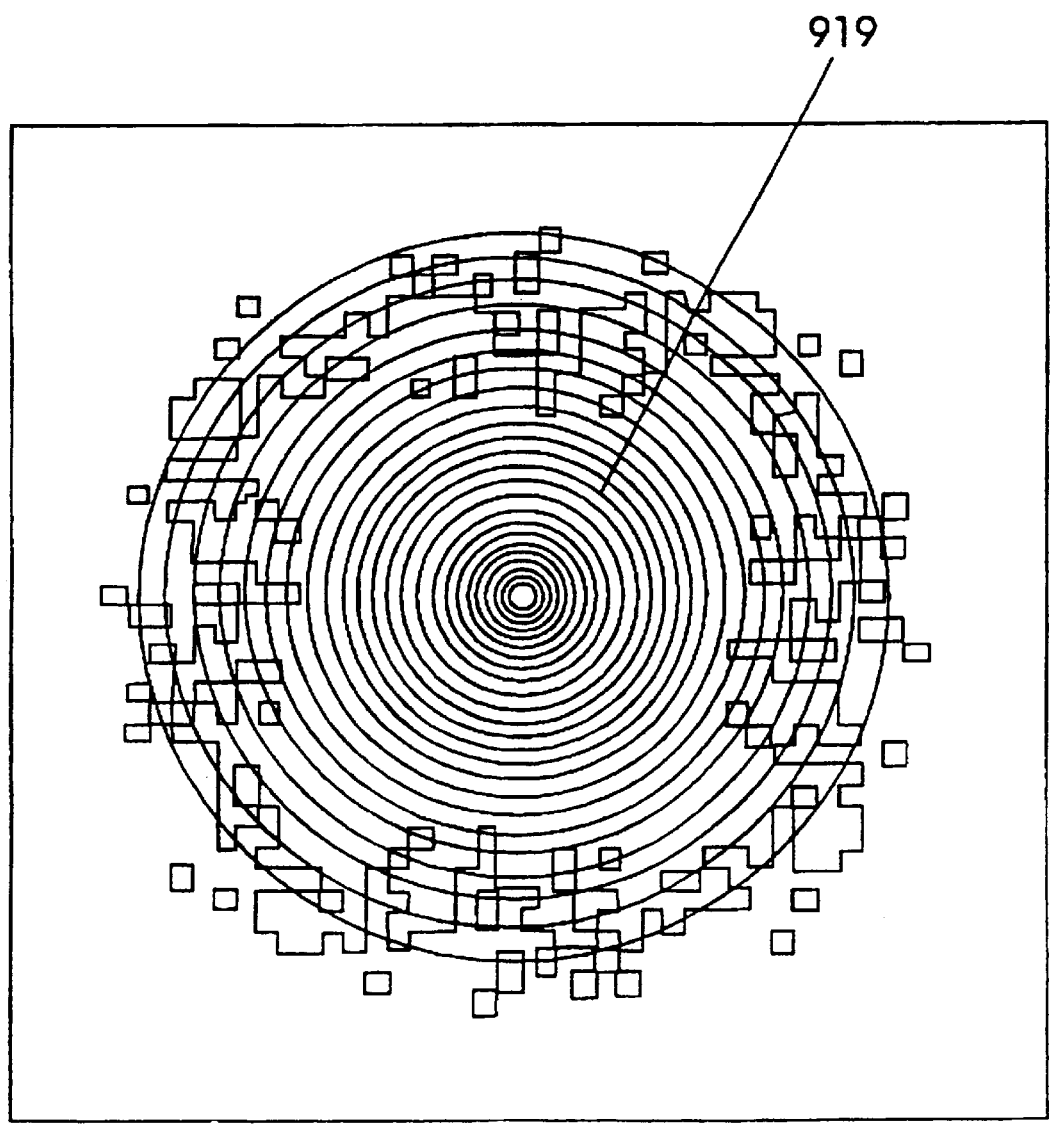
FIG. 10 is a combined soft aperture and collimating lens diffractive optical element.
Figure 11:
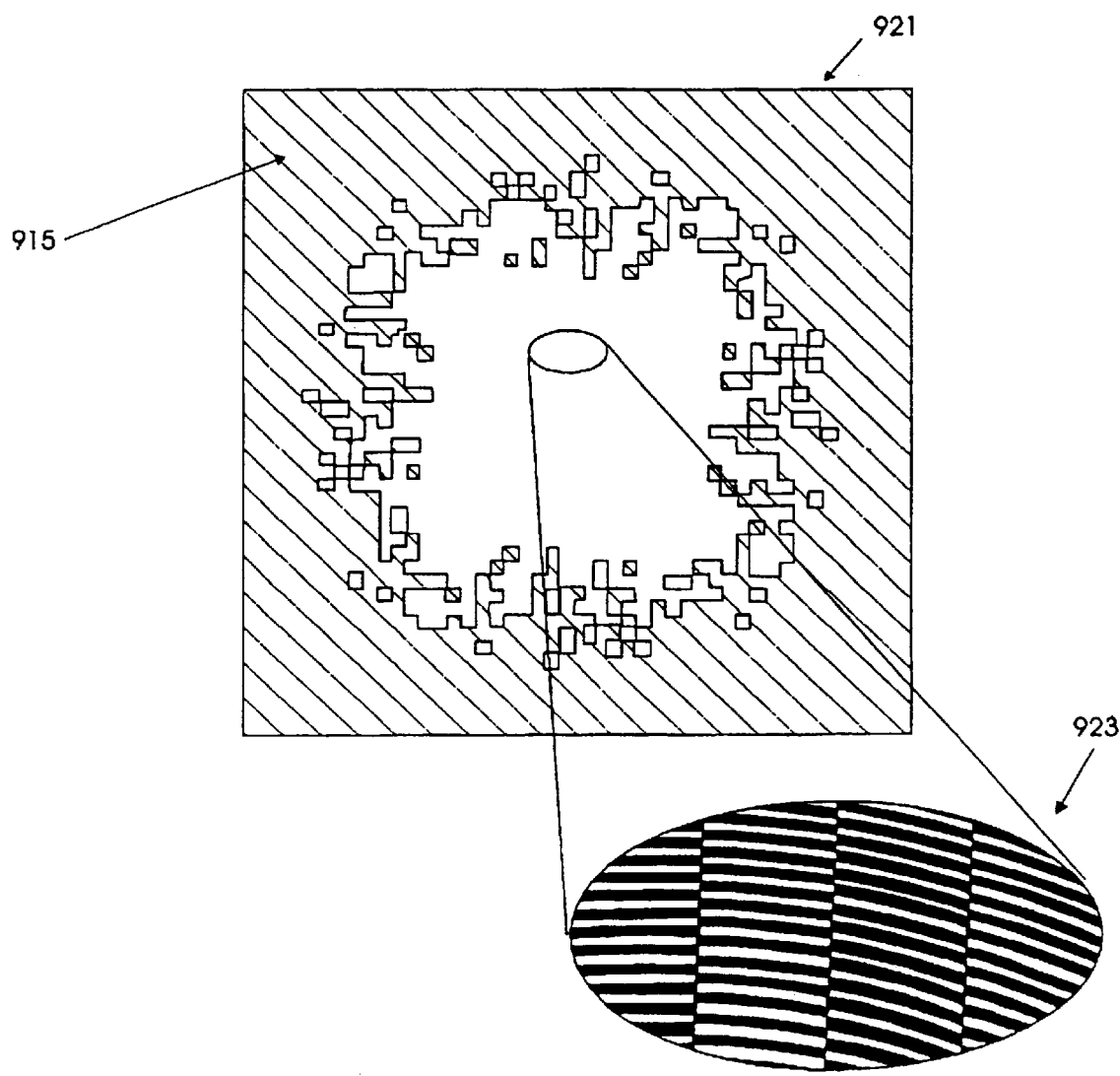
FIG. 11 is a combined soft aperture, collimating lens and image generating diffractive optical element.

FIG. 10 shows a diffractive optical element that combines the functions of circularizing and collimating into one element. The scatter phase grating or alternately, the occluding amplitude modulating areas are arranged in outer and transition regions as in FIG. 9. The central area is not grating free but instead has phase gratings 919 to form a collimating lens, FIG. 11 shows a diffractive optical element 921 that combines the three functions of circularizing, collimating and image generating all in one diffractive optical element. As in FIGS. 4 and 6, a small portion of the central region is expanded at 923 to show the combined collimating lens gratings and image generating gratings as was described with respect to FIG. 3.

Having described the invention in terms of a preferred embodiment thereof, it will be recognized by those skilled in the art of optical system design that various changes in the structure and detail of the implementations described can be made without departing from the spirit and scope of the invention which is measured by the following claims.

We claim:

1. A laser pointer comprising:

a case suitable for being hand held, the case having an opening through which light is projected;

a power source mounted within the case;

a source of coherent light mounted within the case and controllably connected to the power source;

a transparent substrate mounted within the case between the light source and the opening in the case; and a plastic holographic optical element on a face of the transparent substrate for forming the light from the light source into a beam shape of predetermined form.

2. A laser pointer having a housing and a source of coherent light, the improvement comprising:

an optical assembly mounted substantially in the path of the coherent light, for circularizing and collimating the coherent light, the assembly including a plastic diffractive optical image generating element for generating an image to be projected onto a viewing surface.

3. The laser pointer of claim 1, wherein said plastic diffractive holographic optical element is formed by embossing.

4. The laser pointer of claim 1, wherein said plastic diffractive holographic optical element is formed by injection molding.

5. The laser pointer of claim 2, wherein said plastic diffractive optical image generating element is formed by embossing.

6. The laser pointer of claim 2, wherein said plastic diffractive optical image generating element is formed by injection molding.

7. A laser pointer having a housing and a source of coherent light, the improvement comprising:

a transparent substrate mounted within the housing between the source and an opening in the housing; and a plastic holographic optical element on a face of the transparent substrate for forming the light from the source into a beam shape of predetermined form.

8. The laser pointer of claim 7, wherein said plastic diffractive holographic optical element is formed by embossing.

9. The laser pointer of claim 7, wherein said plastic diffractive holographic optical element is formed by injection molding.

10. A laser pointer comprising:

a case suitable for being hand held, the case having an opening through which light is projected;

a power source mounted within the case;

a source of coherent light mounted within the case and controllably connected to the power source; and an optical assembly mounted within the case between the light source and the opening in the case, the optical assembly having a collimator for collimating the light, a circularizer for reducing ellipticity of the light, and an image generator, the image generator being a computer-generated diffractive optical element, the pattern of which is calculated by a computer to diffract the light into a predetermined image.

11. The laser pointer of claim 10, wherein the circularizer is a single diffractive element.

12. The laser pointer of claim 10, wherein at least two of the collimator, the circularizer and the image generator are formed as a single computer-generated diffractive element.

13. The laser pointer of claim 10, wherein the diffractive optical element is plastic.

\* \* \* \* \*